Figure 1:
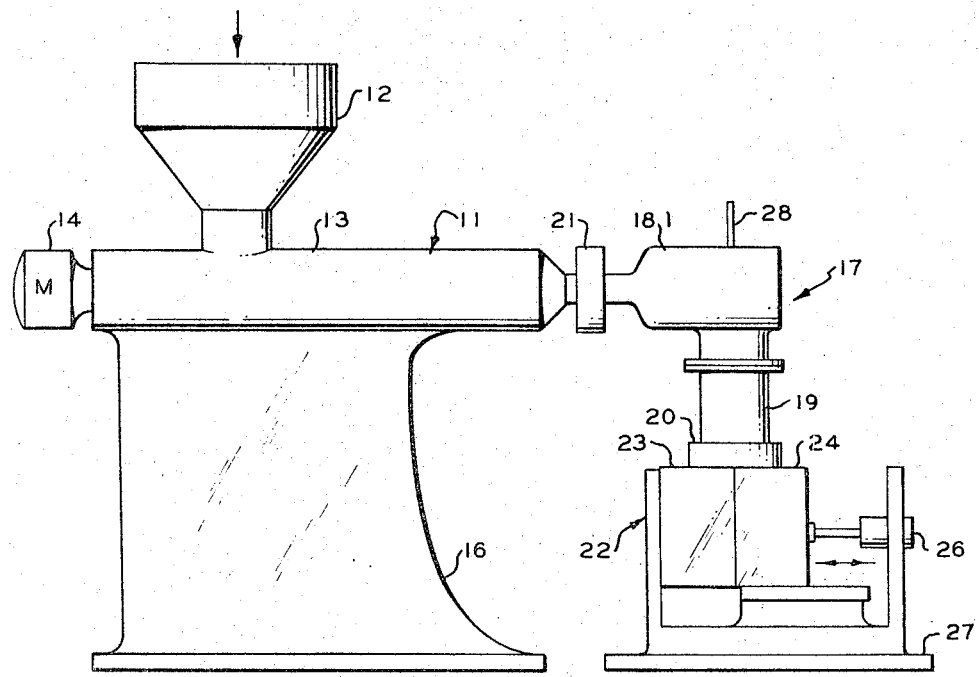

March 14, 1967  J. N. SCOTT, JR., ETAL  3,309,443
PLASTIC MOLDING

Filed Dec. 13, 1963  3 Sheets-Sheet 1

INVENTORS
J. N. SCOTT, JR.
D. L. PETERS
BY
ATTORNEYS

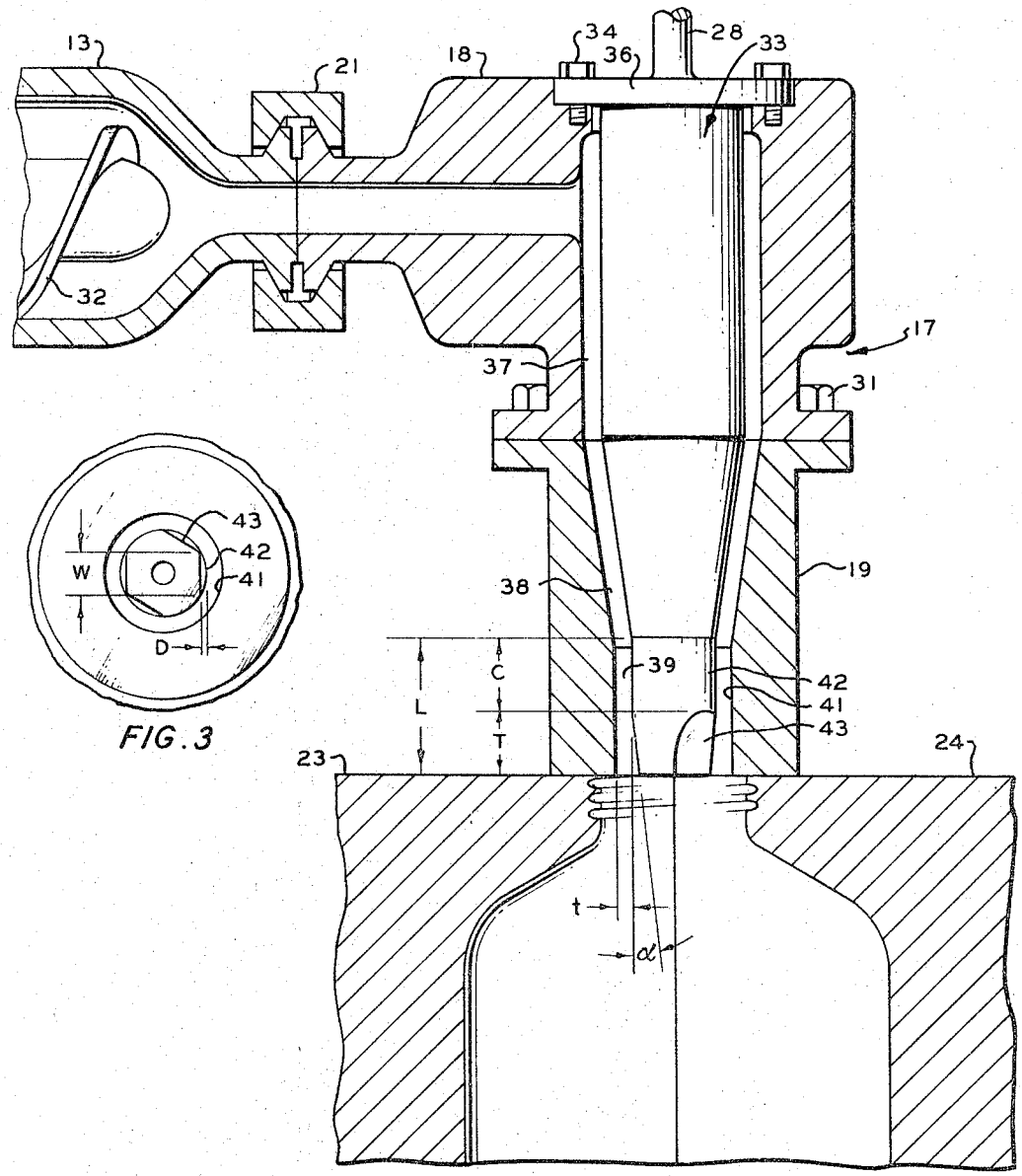

March 14, 1967   J. N. SCOTT, JR., ETAL   3,309,443
PLASTIC MOLDING

Filed Dec. 13, 1963   3 Sheets-Sheet 3

INVENTORS
J.N. SCOTT, JR.
D.L. PETERS

BY

ATTORNEYS

United States Patent Office 3,309,443
Patented Mar. 14, 1967

3,309,443
PLASTIC MOLDING
John N. Scott, Jr., and Donald L. Peters, Bartlesville, Okla., assignors to Phillips Petroleum Company, a corporation of Delaware
Filed Dec. 13, 1963, Ser. No. 330,430
7 Claims. (Cl. 264—98)

This invention relates to plastic molding. In one aspect it relates to a method for blow molding an object having a non-circular cross-section and uniform wall thickness. In an another aspect it relates to a method for extruding a parison for blow-molding, the parison having a non-uniform wall thickness. In another aspect it relates to a parison extrusion die. In another aspect it relates to blow molding apparatus.

Blow-molding is a very useful technique whereby a hollow extrusion of plasticized molding material (a parison) is confined in a mold of the desired shape, and expanded to contact the wall of the mold by gas pressure applied inside the parison, thereby forming an object of the desired shape. When the molded object has a non-circular cross-section, as for example in molding a square or elliptical bottle, sections of maximum elongation of the parison wall become thinner than the remainder, thereby forming an object having non-uniform wall thickness. Efforts to solve the problem by extruding non-circular parisons, for example elliptical or rectangular parisons, or by extruding parisons having non-uniform wall thickness, previously have failed, because of non-uniform linear rates of extrusion, causing twisting and collapsing of the parison.

An object of the invention is to mold a plastic material.

Another object of the invention is to form by blow molding an object having non-circular cross-section and uniform wall thickness.

Another object of the invention is to extrude a parison having non-uniform wall thickness, all portions of the parison being extruded a constant linear rate.

Other aspects, objects, and the advantages of my invention are apparent in the written description, the drawing, and the claims.

According to the invention there is provided a relatively long land length parison die, circular at the entrance of the die and shaped to give a desired non-uniform wall thickness parison extrudate at the exit of the die. A smooth transition occurs within the die from the circular entrance to the non-uniform wall thickness exit, the exit cross-section being somewhat larger than the circular cross-section. The non-uniform wall thickness can be obtained by a gradual enlargement of portions of the parison die bushing, by gradual reduction in the size of the parison die mandrel or a combination of both.

Further, according to the invention objects having non-circular cross-section but uniform wall thickness are formed by blow-molding a parison having relatively thick walls at locations of above average elongation during the molding operation, by forming a moldable plastic material into a circular first cross-section having substantially uniform wall thickness by forcing into a die, and continuing forming of the material through the die while gradually enlarging the first cross-section into a second cross-section having non-uniform wall thicknes, and extruding the material from the die in the form of the second cross-section, and making the object from the parison by blow molding.

Further according to the invention there is provided blow-molding apparatus, comprising a relatively long land length parison die circular at the entrance of the die, shaped to give a non-uniform wall thickness parison extrudate at the exit of the die, means to supply plasticized molding material to the die and to extrude a non-uniform wall thickness parison therefrom, and means to form from the parison by blow molding an object having non-circular cross-section of uniform wall thickness.

Figure 6:
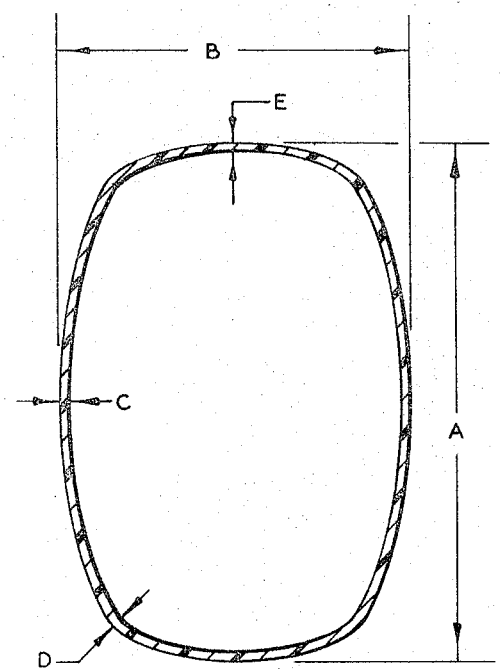
Figure 7:
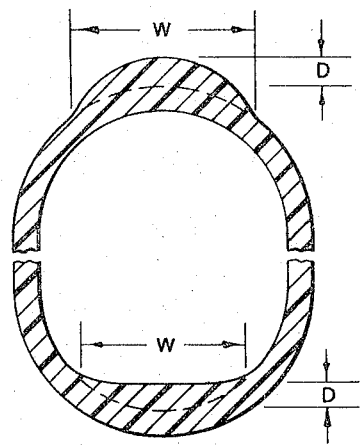
Figure 4:
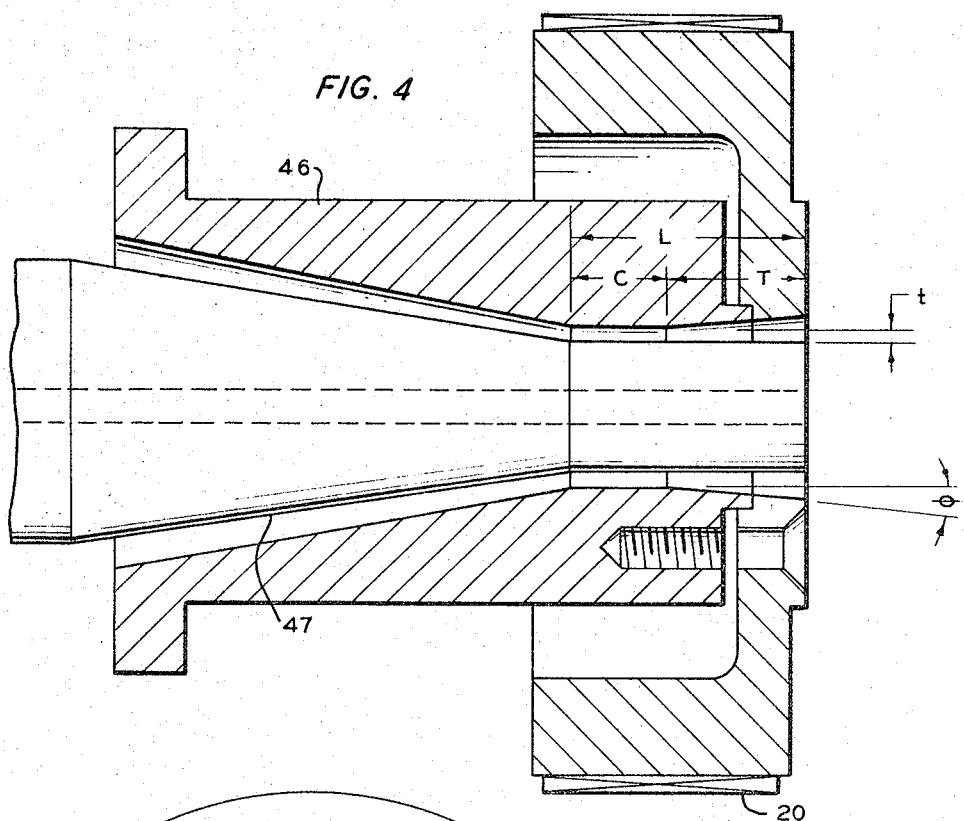
Figure 5:
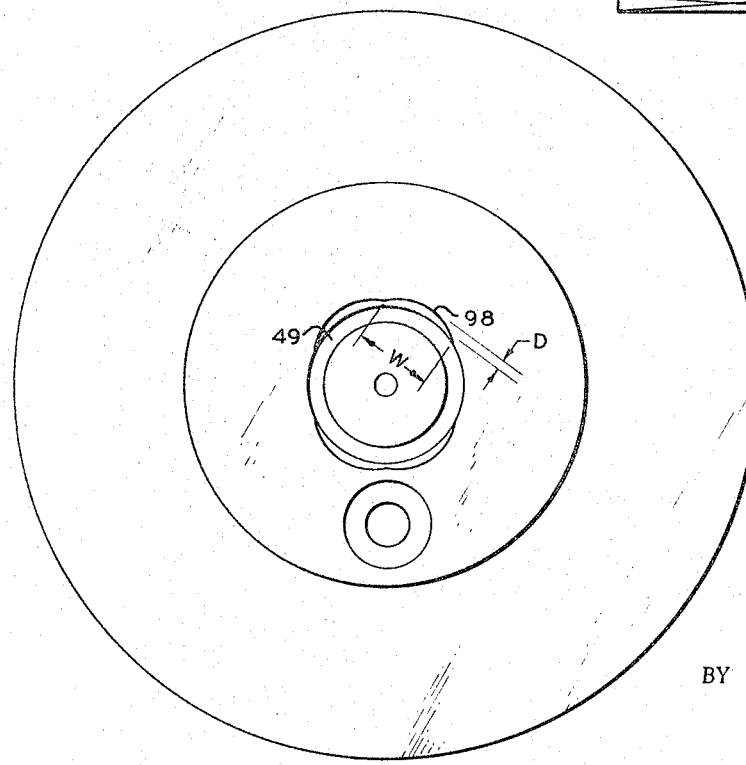

In the drawing:
FIGURE 1 is a vertical elevation of a blow molding apparatus.
FIGURE 2 is a vertical cross-section of a portion of the apparatus of FIGURE 1.
FIGURE 3 is a cross-section of a portion of the apparatus of FIGURE 2 illustrating another embodiment of the invention.
FIGURE 4 is a vertical cross-section of another embodiment of the die of the invention.
FIGURE 5 is an inverted plan of the die of FIGURE 4.
FIGURE 6 is a horizontal cross-section of a blow molded bottle.
FIGURE 7 is a horizontal cross-section of an extruded parison.

Referring to FIGURE 1, there is illustrated a plasticizing and extrusion means 11, which comprises a feed hopper 12, and an extruder 13, driven by motor 14 and supported on base 16. A cross-head die 17 comprises a T 18, a die bushing 19 and a band heater 20, held in position with relation to extrusion means 11 by clamp 21. Die 17 is positioned above a blow mold 22, which comprises mold halves 23 and 24 and an actuating cylinder 26, all mounted on base 27. An air inlet 28 is provided to cross head die 17.

In operation, a thermoplastic material in particulate form is supplied to feed hopper 12, and is plasticized and fed by a screw (not shown) in extruder 13, driven by motor 14. Suitable heating means (not shown) is provided if desired. The plasticized material is fed through T 18 and die bushing 19, and a generally cylindrical parison is extruded between the mold halves 23 and 24, mold half 24 being moved to one side by cylinder 26. After extrusion of the parison, mold half 24 is again moved into position adjacent mold half 23, thus confining the parison, following which air is introduced through inlet 28 to expand the parison into contact with the walls of the mold to form the desired article.

In FIGURE 2, the screw 32 is visible within extruder 13, and die mandrel 33 is visible within cross-head die 17. Die bushing 19 is supported on T 18 by means of die bolts 31, while mandrel 33 is attached within T 18, held in place by bolts 34 and supported on flange 36.

The extrusion passageway 37 formed between T 18 and mandrel 33 is in open communication with a tapered passageway 38 which in turn communicates with a cylindrical passageway 39. In its lower portion, die bushing 19 is formed with a cylindrical portion 41. Together with cylindrical portion 42 of mandrel 33, this forms the cylindrical passageway 39. The lower portion of mandrel 33 is partially cut away to increase the cross-sectional area of the passageway near the outlet end of die bushing 19. This portion of mandrel 33 is indicated by the numeral 43.

As illustrated in FIGURE 3, the lower portion 41 of bushing 19 remains cylindrical to the discharge end while the lower end of mandrel 33 is partially tapered and gradually assumes a shape that the extruded parison has thickened portions at locations of maximum stretching of the parison as it is forced outwardly to the mold wall. For instance, when the object being molded has relatively flat sides, portions of the parison must be moved a longer distance to reach the mold walls than other portions of the parison. These portions are made thicker to equalize the wall thickness after the article is molded.

As noted above, previous efforts to solve the problem by extruding non-circular parisons have failed because of non-uniform linear rate of extrusion causing twisting and collapse of the parisons. By use of this invention uniform linear rates of extrusion are obtained even with non-uniform wall thickness parisons, thus avoiding the difficulties previously encountered. This is accomplished by using a relatively long land die which is circular as the entrance of the die but which is shaped to give the desired thickness of extrudate downstream from the entrance. This shaping can take form of an irregularly shaped die bushing, with the irregularity decreasing upstream from the exit, or can take the form of an irregularly shaped die mandrel as illustrated in FIGURES 2 and 3.

In FIGURE 4 a die bushing 46, similar in outward configuration to die bushing 19, is provided with an irregularly shaped exit end as described above. In this embodiment the mandrel 47 remains circular in cross-section throughout its length, being cylindrical through the lower portion. Details of the support for band heater 20 also are shown in this figure.

FIGURE 5 shows the configuration of the die bushing 46 at its lower end, and the cylindrical portion from which the irregular portion gradually extends also can be seen. The irregularly shaped outlet is referred to by the numeral 48 and the cylindrical portion by the numeral 46.

In the following discussion, the letters refer to FIGURE 2 and FIGURE 4. For proper operation of the invention, there must be a choke section, such as the section C, which can be very short or can be a cylindrical section having appreciable length. The choke section must be sufficient to permit the parison to extrude properly, that is at constant speed over the entire circumference, but not so small that the desired parison rate cannot be attained. The length of the tapered section, whether on the mandrel or the bushing, is designated T, while the sum of C and T is designated L. The clearance between the mandrel and the bushing at the choke section is $t$. The taper of the mandrel is $\alpha$ and the taper of the bushing is $\theta$.

In the extruded parison, at the die outlet, as shown in FIGURE 7, the width of the thickened portion is W, the nominal wall thickness is $t_1$, which is the same as the choke section clearance $t$ in many instances, and the maximum increase in thickness of the thickened portion is D. In this figure, the upper portion represents a parison extruded with a tapered bushing, while the lower portion represents a parison extruded with a tapered mandrel.

For best operation it is preferred that the following relationship be observed:
If $W<t_1, D/W\leq 1$.
In all instances $D/W\leq 3$.
100 or more $\geq L/T \geq 3$.
$C/t \geq 1$.
$T/L \geq 1/10$.
$45° \geq \alpha+\theta \geq 1/4°$.
Preferably $\alpha$, $\theta$ and $\alpha+\theta$ are in the range of 1° to 5°.

*Example I*

A die bushing and mandrel were constructed as illustrated in FIGURES 4 and 5. The diameter of the lower cylindrical portion of the mandrel was 0.40 inch, the diameter of the die bushing at its cylindrical portion was 0.610 inch, the length C of the cylindrical portion of the mandrel was $11/16$ inch, and the tapered portion T which terminated in the irregularly shaped portion 48 was formed by tapering the inner cylindrical surface of die bushing 46 at an angle $\theta$ of 3 degrees to a maximum deviation D at the outer end of 0.015 inch. Bottles were molded having the cross-sectional shape illustrated in FIGURE 6 wherein the dimension A was $3\,11/16$ inches and the dimension B was 2½ inches. Utilizing the die of FIGURE 4 and FIGURE 5, dimension C was 0.017 inch, dimension D was 0.012 inch and dimension E was 0.013 inch. This example demonstrates that a non-uniform wall thickness parison can be extruded without difficulty with the die of FIGURES 4 and 5, and that a non-circular uniform wall thickness object can be formed therefrom.

*Example II*

Utilizing the die of FIGURE 4 and FIGURE 5, except that a standard bushing, that is a bushing identical in all respects with the bushing 46 of FIGURE 4 except that it was cylindrical throughout its lower length, was used, a bottle formed with the shape illustrated in FIGURE 6, from the resulting uniform wall thickness parison, had a dimension C of 0.029 inch, a dimension D of 0.005 inch and a dimension E of 0.020 inch. This example demonstrates that there is a large variation in wall thickness when an object having the shape illustrated in FIGURE 6 is molded from a uniform wall thickness parison.

*Example III*

Using a die similar to that illustrated in FIGURE 2 and FIGURE 3, wherein the die bushing is tapered as illustrated and the dimension C was $11/32$ inch, T was $11/32$ inch, and D was 0.031 inch, a circular parison was used to blow-mold a structure having the cross-sectional shape illustrated in FIGURE 6. The dimension C was 0.020 inch, dimension D was 0.022 inch, and dimension E was 0.018 inch. This example demonstrates that successful operation can be accomplished with a tapered mandrel.

Resonable variation and modification are possible within the scope of this invention which sets forth method and apparatus for forming an unequal wall thickness parison and blow-molding non-circular cross-section objects therefrom.

We claim:

1. A method for blow-molding an object having a non-circular cross-section with substantially uniform wall thickness which comprises the steps of:

extruding a parison having non-uniform wall thickness, each relatively thick portion of said parison corresponding with a locus of above average elongation during molding, by forming a moldable plastic material into a circular first cross-section having substantially uniform wall thickness by forming into a die and continuing forming said material through said die while gradually enlarging the first cross-section into a second cross-section having non-uniform wall thickness, and extruding said material from said die in said second cross-section; and forming said object by molding said parison by blowing in a mold having said non-circular cross-section.

2. A method for producing a parison having non-uniform wall thickness from moldable plastic material, which comprises the steps of:

forming said material into a circular first cross-section having substantially uniform wall thickness by forming in a die;

continuing forming said material in said die, while gradually enlarging the first cross-section of said material to a second cross-section having non-uniform wall thickness; and extruding said material from said die in said second cross-section.

3. A method for blow molding an object having a non-circular cross-section with substantially uniform wall thickness, which comprises the steps of:

extruding a parison having non-uniform wall thickness, each relatively thick portion of said parison corresponding with a locus of above average elongation during molding, by forming a moldable plastic material into a circular first cross-section, having a length C and a substantially uniform wall thickness $t$, and continuing forming said material in a transition zone having a length T and non-parallel walls making an angle $\alpha+\theta$, as it progresses forward while gradually enlarging said first cross-section into a second cross-section having non-uniform wall thickness, the length $C+T$ being equal to a length L, wherein the following relationships exist:

$100 \geq L/t \geq 3$;
$C/t \geq 1$;
$T/L \geq 1/10$; and
$45° \geq \alpha+\theta \geq \frac{1}{4}°$;

expelling said parison in said second cross-section; and forming said object by molding said parison by blowing in a mold having said non-circular cross section.

4. A method for producing a parison having non-uniform wall thickness from moldable plastic material, which comprises the steps of:
   forming said material into a circular first cross-section having substantially uniform wall thickness by forming in a die;
   passing said material in said circular cross-section through a cylindrical portion of said die;
   continuing forming said material in said die, while gradually enlarging the first cross-section of said material to a second cross-section having non-uniform wall thickness; and
   extruding said material from said die in said second cross-section.

5. A parison extrusion die, comprising:
   a die bushing;
   a mandrel;
   the interior surface of said bushing and the exterior surface of said mandrel being formed and positioned to enclose between them;
   a first generally cylindrical extrusion passageway wherein said interior surface of said bushing and said exterior surface of said mandrel are substantially parallel;
   a second extension passageway wherein portions of said interior surface and exterior surface are non-parallel;
   a parison extrusion opening for a parison having non-uniform wall thickness; and
   said second extrusion passage forming a smooth transition between said first passageway and said extrusion opening, said extrusion opening having a larger cross-section than said first passageway.

6. Blow-molding apparatus for forming a molded object having non-circular uniform wall thickness cross-section, comprising:
   molding means for forming said molded object;
   a parison die for supplying a parison to said mold, said die comprising a long land die tapering from a circular cross-section confining said plastic material in a substantially uniform wall thickness section to an exit from which a non-uniform wall parison is extruded, said exit having a larger cross-sectional area than said circular section; and
   plasticizing means for supplying moldable plastic material under pressure to said die.

7. A parison extrusion die, comprising:
   a die bushing;
   a mandrel;
   the interior surface of said bushing and the exterior surface of said mandrel being formed and positioned to enclose between them;
   a first generally cylindrical extrusion passageway having a length C wherein said interior surface of said bushing and said exterior surface of said mandrel are substantially parallel and spaced apart a distance $t$;
   a second extrusion passageway having a length T wherein portions of said interior surface and said exterior surface are angularly disposed at an included angle $\alpha+\theta$, the length of $C+T$ being equal to a length L;
   said second extrusion passage forming a smooth transition between said first passageway and said extrusion opening, said extrusion opening having a larger cross-section than said first passageway;
   wherein the following relationships exist:

$100 \geq L/t \geq 3$;
$C/t \geq 1$;
$T/L \geq 1/10$; and
$45° \geq \alpha+\theta \geq \frac{1}{4}°$.

References Cited by the Examiner

UNITED STATES PATENTS

| | | | |
|---|---|---|---|
| 3,078,507 | 2/1963 | Park | 18—5 |
| 3,114,932 | 12/1963 | Donnelly | 264—98 |
| 3,217,360 | 11/1965 | Mason et al. | 18—14 |

ROBERT F. WHITE, *Primary Examiner.*

ALEXANDER H. BRODMERKEL, *Examiner.*

A. R. NOE, *Assistant Examiner.*